(12) United States Patent
Chevreau et al.

(10) Patent No.: US 8,074,285 B2
(45) Date of Patent: *Dec. 6, 2011

(54) COPY PROTECTION METHOD FOR DIGITAL DATA STORED ON A MEDIUM

(75) Inventors: Sylvain Chevreau, Rennes (FR); Teddy Furon, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 125 days.

This patent is subject to a terminal disclaimer.

(21) Appl. No.: 12/427,875

(22) Filed: Apr. 22, 2009

(65) Prior Publication Data
US 2009/0232303 A1    Sep. 17, 2009

Related U.S. Application Data

(62) Division of application No. 09/787,722, filed as application No. PCT/FR99/02267 on Sep. 23, 1999, now Pat. No. 7,631,358.

(30) Foreign Application Priority Data

Sep. 23, 1998 (FR) ..................................... 98 11860

(51) Int. Cl.
G06F 12/14 (2006.01)
G06F 7/04 (2006.01)
G06F 21/00 (2006.01)

(52) U.S. Cl. ............... 726/26; 713/189; 705/50; 705/51

(58) Field of Classification Search ...................... 726/30
See application file for complete search history.

(56) References Cited

U.S. PATENT DOCUMENTS

| | | | | |
|---|---|---|---|---|
| 5,694,381 A * | 12/1997 | Sako | ............ | 369/47.12 |
| 5,745,569 A * | 4/1998 | Moskowitz et al. | ............ | 705/58 |
| RE35,839 E * | 7/1998 | Asai et al. | ............ | 713/2 |
| 5,842,023 A | 11/1998 | Tsumura | | |
| 5,896,454 A * | 4/1999 | Cookson et al. | ................. | 360/60 |
| 5,930,358 A * | 7/1999 | Rao | ............ | 713/193 |
| 6,021,199 A * | 2/2000 | Ishibashi | ............ | 380/217 |
| 6,246,802 B1 | 6/2001 | Fujihara | | |
| 6,256,390 B1 | 7/2001 | Okuyama | | |
| 6,314,518 B1 * | 11/2001 | Linnartz | ............ | 713/176 |

(Continued)

FOREIGN PATENT DOCUMENTS

JP       6-334616 A     12/1994

(Continued)

*Primary Examiner* — Ponnoreay Pich
(74) *Attorney, Agent, or Firm* — Robert D. Shedd; Joseph J. Opalach; Catherine A. Cooper

(57) ABSTRACT

A method of protection against the copying of digital data stored on an information carrier envisages, on the basis of a first identification of an encryption of the digital data and of a second identification of a watermarking of digital data, the determination of a first mark if it has been possible to identify the encryption and the watermarking. A third identification of a type of the information carrier is followed by the determination of a second mark if it has been possible to determine the first mark and if has been possible to identify a determined type of information carrier. A fourth identification of cryptographic signature data accompanying the digital data is followed by the determination of a third mark if it has been possible to determine the second mark and if it has been possible to identify a cryptographic signature datum. A permission for digital copying of the digital data is delivered if it has been possible to determine the third mark.

8 Claims, 4 Drawing Sheets

U.S. PATENT DOCUMENTS

| | | | |
|---|---|---|---|
| 6,421,450 B2 * | 7/2002 | Nakano | 382/100 |
| 6,490,355 B1 * | 12/2002 | Epstein | 380/203 |
| 6,553,070 B2 | 4/2003 | Hashimoto | |
| 6,571,220 B1 * | 5/2003 | Ogino et al. | 705/51 |
| 7,000,113 B1 * | 2/2006 | Linnartz | 713/176 |
| 7,031,942 B2 * | 4/2006 | Ogino et al. | 705/51 |
| 2003/0159043 A1 * | 8/2003 | Epstein | 713/176 |

FOREIGN PATENT DOCUMENTS

| | | |
|---|---|---|
| JP | 6334616 A | 12/1994 |
| JP | 7-288798 A | 10/1995 |
| JP | 09-055025 A | 2/1997 |
| JP | 9-160899 A | 6/1997 |
| JP | 10-155151 A | 6/1998 |
| JP | 10-241288 A | 9/1998 |
| JP | 10-243398 A | 9/1998 |
| JP | 10241288 A | 9/1998 |
| WO | 96/00963 A1 | 1/1996 |
| WO | 9600063 A1 | 1/1996 |
| WO | 9713248 A1 | 4/1997 |
| WO | 97/33283 A1 | 9/1997 |

* cited by examiner

COPY PROTECTION METHOD FOR DIGITAL DATA STORED ON A MEDIUM

CROSS-REFERENCE TO RELATED APPLICATIONS

This is a divisional application of U.S. Non-Provisional patent application Ser. No. 09/787,722 filed Mar. 21, 2001 now U.S. Pat No. 7,631,358 by Sylvain Chevreau et al. This non-provisional application claims the benefit under 35 U.S.C. §365 of International Application PCT/FR99/02267, filed Sep. 23, 1999, which was published in accordance with PCT Article 21(2) on Mar. 30, 2000 in French, and which claims the benefit of French Patent Application No. 9811860 Filed Sep. 23, 1998.

BACKGROUND OF THE INVENTION

1. Field of the Invention

The invention relates to a method and a device making it possible to protect against the copying of digital data stored on an information carrier.

2. Description of the Related Art

A possibility inherent in digital data is that they can be copied without appreciable loss of quality since copying consists in transmitting a series of "1"s and "0"s from the source to the recorder. The greatest number of errors which may occur when copying can be countered by using error correction methods. Thus, when an information carrier contains digital data, it is in principle relatively simple to record the content of the information carrier identically on a recordable carrier.

Numerous types and kinds of information carriers are used to store information of all sorts in digital form. For example, a magnetic tape, a recordable or non-recordable optical disk (CD, CD-R, CD-RW, DVD, DVD-R, magneto-optical disk, etc., respectively standing for Compact Disk, CD-Recordable, CD-Read Write, Digital Versatile Disk, DVD-Recordable) can store audio and/or video information in digital form.

In order to better safeguard for example the interests of the authors of stored information or those of producers of prerecorded information carriers, it is desirable to limit the possibilities of freely and simply copying the digital data. Various mechanisms and possibilities currently exist for protecting digital data against illegitimate copying.

In a known manner, the digital data can be encrypted when they are stored on the information carrier. Encryption makes it possible to limit the use of the digital data to the holder of a public or private deciphering key. Encryption is for example used in the protection of data on DVDs, optical disks used to store video data in digital form. Thus, a DVD player requires an appropriate key in order to decrypt the data read from the DVD.

One way of protecting digital data against copying consists in furnishing them with a watermark, that is to say with auxiliary data attached to the digital data. The watermark must be unmodifiable and non-erasable. The playing of the data is carried out with the aid of a public key which identifies the watermark. The public key is a code well known to the public, or more precisely contained in most players of information carriers. Should the watermarked digital data be copied, a private key is required in order to put the watermark back in place on the copy, failing which the copy becomes illegal devoid as it is of watermark. The private key is held by the author or the producer of the information thus watermarked. The digital data copied without watermark are no longer played by the player since the latter does not identify any watermark where it ought to find one. Thus, the watermark precludes copying without the private key. If a copy is necessary then the recorder must build in this private key.

Watermarking does not prevent the copying of the digital data by an analog route, that is to say copying which would firstly require conversion of the digital data into an analog signal and which would take the analog signal as the source of the copy.

A known solution for preventing the copying of a digital carrier by an analog route and more particularly in the field of video and television consists in corrupting the analog signal in such a way that it can be used to display an image on the screen of a television set by way of an analog input of this television set, but so that the same signal cannot be used to make a copy with a video recorder. More precisely, an electronic circuit is employed to influence image synchronization parameters. These synchronization parameters are perceived differently by a television set and by a video recorder. This solution does not make it possible to prevent the digital copying of digital data.

Another solution for limiting digital copies of digital data consists in furnishing the latter with copy generation management information. In principle, this information item conveys the information item "never copy" for data which do not have the right to be copied and the information item "copy" or "copy number X" if the data are a first generation or X-th generation copy of an original. Thus, a recorder can, with the aid of these information items, ascertain whether the digital data to be copied have the right to be copied digitally and prevent copying if it is prohibited for the 2nd or (X+1th) generation. The copy generation management information item is updated with each copy. This manipulation of the copy generation management information item renders it vulnerable to falsification. Specifically, the copy generation management information item is at one stage of copying available as plaintext, that is to say in decrypted form. The manipulation also requires the digital recorder to be equipped accordingly. The copy generation management information item does not by itself make it possible to prevent copying by an analog route.

BRIEF SUMMARY OF THE INVENTION

An object of the invention consists in finding a solution for protection against digital copying in which no information item relating to the generation of copy is available as plaintext when copying.

Another object of the invention consists in finding a solution in which no modification of data relating to protection against copying is undertaken upon the possible recording of a copy.

A solution proposed by the invention envisages a method of protection against the copying of digital data stored on an information carrier, comprising a first identification of an encryption of the digital data, a second identification of a watermarking of digital data, a first determination of a first mark if it has been possible to identify the encryption and the watermarking, a third identification of a type of the information carrier, a second determination of a second mark if it has been possible to determine the first mark and if it has been possible to identify a determined type of information carrier, a fourth identification of cryptographic signature data accompanying the digital data, a third determination of a third mark if it has been possible to determine the second mark and if it has been possible to identify a cryptographic signature datum, a first delivery of a permission for digital copying of the digital data if it has been possible to determine the third mark.

A first advantageous implementation of the invention envisages a second delivery of a prohibition of playing of the digital data if the first identification is negative and if it has been possible to identify the watermarking, or if it has been possible to identify the encryption and the second identification is negative.

A second advantageous implementation of the invention envisages a third delivery of a permission for digital copying of the digital data if the first and second identifications are negative.

A third advantageous implementation of the invention envisages a fourth delivery of a prohibition of digital copying of the digital data if it has been possible to determine the first mark and if the third identification reveals a different type from the determined type of information carrier.

A fourth advantageous implementation of the invention envisages a fifth delivery of a prohibition of digital copying of the digital data if it has been possible to determine the second mark and if the fourth identification is negative.

A fifth advantageous implementation of the invention envisages a conversion of the digital data into analog signals and a corruption of the analog signals if the first, the fourth or the fifth delivery has been implemented.

A sixth advantageous implementation of the invention envisages that the prohibition of digital copying comprises a blocking of output of the digital data.

Another solution proposed by the invention envisages a device for playing digital data stored on an information carrier comprising at least, a digital output for providing signals representative of the digital data upon playing the digital data, an analog output for providing analog signals representative of the digital data upon playing the digital data, a decryption system for the digital data making it possible in particular to establish whether the digital data are encrypted and, if so, to decryption the encrypted digital data, to identify whether the digital data comprise a watermark and/or cryptographic signature data, and to identify a type of the information carrier, a system for protection against the copying of digital data receiving signals from the decryption system so as to evaluate them, and generating a copy permission signal in the case where the digital data are encrypted, have a watermark, are on a carrier of non-recordable type and possess cryptographic signature data, a recording control part for managing a stream of digital data heading for the digital output when it receives in particular a copy permission signal, a playing protection system, receiving signals from the decryption system and generating a playing prohibition signal when the digital data are not encrypted but watermarked, or when the digital data are encrypted but not watermarked, a playing control part for interrupting the playing of the data or their output to the analog output when it receives in particular a playing prohibition signal.

BRIEF DESCRIPTION OF THE DRAWINGS

In what follows, exemplary implementations are presented which will illustrate the invention and provide a better understanding thereof, while referring to FIGS. 1 to 7, briefly described hereinbelow.

DETAILED DESCRIPTION OF THE INVENTION

Figure 1:
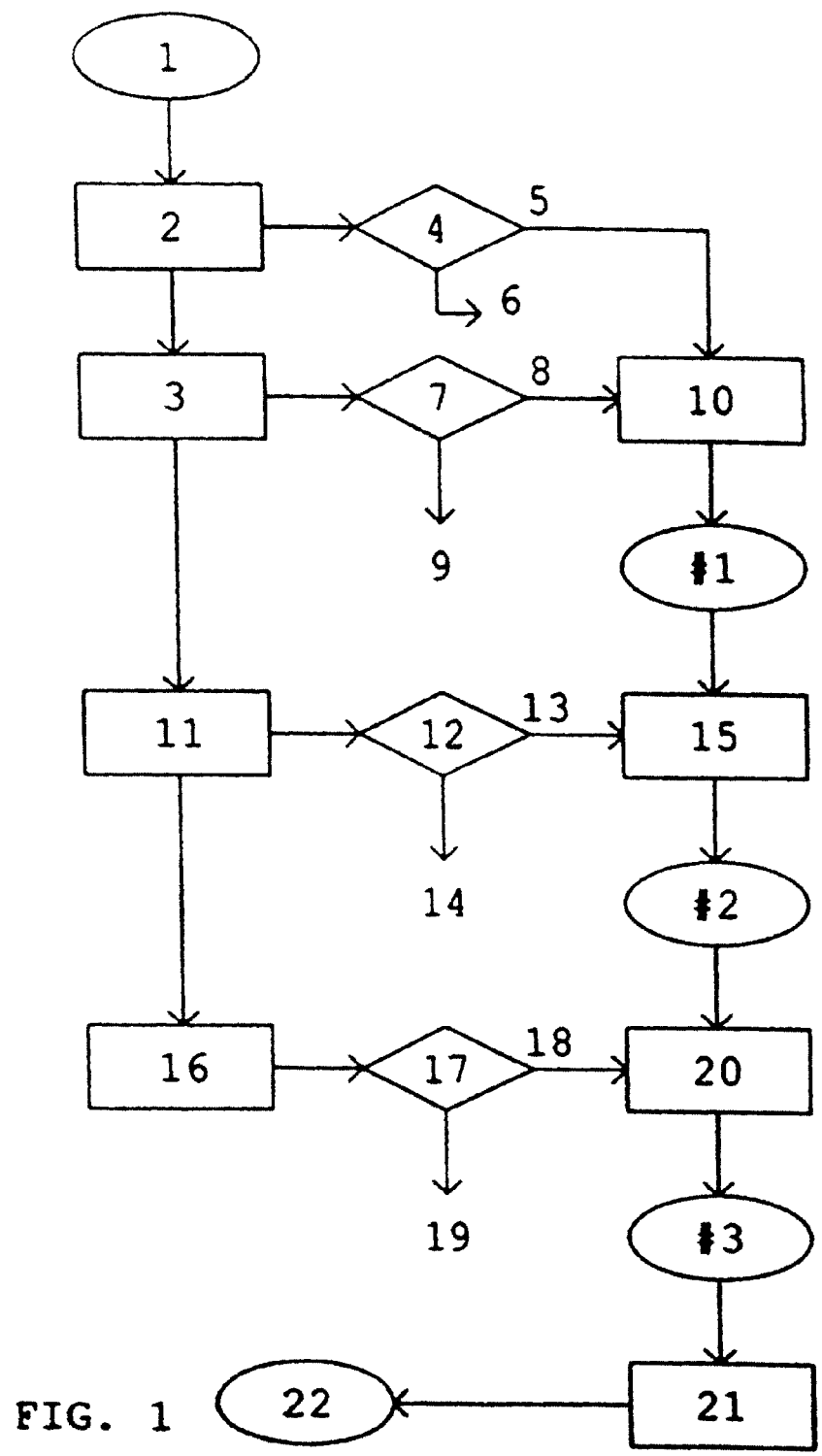
FIG. 1 contains a flowchart illustrating an embodiment of the invention.

FIG. 1 contains a flowchart in which digital data stored on an information carrier 1 are subjected to a first identification of an encryption 2 so as to verify whether the digital data are stored in encrypted form, then to a second identification of a watermark 3 so as to see whether the data are provided with a digital watermark. A first bifurcation 4 makes it possible to distinguish the cases in which an encryption is identified 5 or not 6. A second bifurcation 7 makes it possible to distinguish the cases in which a watermark is identified 8 or not 9. If cases 5 and 8 are indeed verified, a first determination 10 generates a first mark #1.

A third identification 11 of a type of the information carrier 1 serves to see whether the information carrier is for example of the non-recordable or recordable type. An information item regarding the type can be contained in the digital data per se or result from physical measurements of parameters of the information carrier 1 during for example installation in a player of the information carrier 1. A third bifurcation 12 makes it possible to distinguish the cases in which the type might be a determined type 13, for example a non-recordable information carrier such as a pressed optical disk, or not 14. If case 13 is indeed verified and the first mark #1 has been generated, then a second determination 15 generates a second mark #2.

A fourth identification 16 of cryptographic signature data verifies whether the digital data possess a cryptographic signature. A fourth bifurcation 17 makes it possible to distinguish the cases in which the cryptographic signature is present 18 or not 19. If case 18 is indeed verified and the second mark #2 has been generated, then a third determination 20 generates a third mark #3.

In the presence of the third mark #3, a first delivery 21 of permission for digital copying 22 of the digital data is implemented.

Overall, the flowchart of FIG. 1 shows how various criteria pertaining to the digital data and also to the information carrier can lead to the delivery of permission for digital copying, the idea being to allow copying only under defined conditions. For example, the data should not have been manipulated and hence should be encrypted and watermarked. Next, the data should not yet have been copied. If the data are on a non-recordable disk then a priori the data are on an original information carrier. Finally, the data should possess a cryptographic signature. The latter indicates that the data can be copied. It is then that the data receive the permission for digital copying. A result of the copying of the data will be identical to the original except as regards the information carrier which will have to be recordable. A new copy of the data from the recordable information carrier would be impossible since the second mark #2 could not be generated after the third identification 11. Specifically, the third bifurcation 12 would lead us to case 14.

Other exemplary cases need to be considered when for example the encryption or the watermarking of the digital data cannot be identified. Normally, encryption and watermarking go hand in hand and the absence of one or the other is evidence of illicit manipulation of the digital data. It is then necessary to go further than simply prohibiting the copying of the digital data. The playing of the latter must be prevented.

Figure 2:
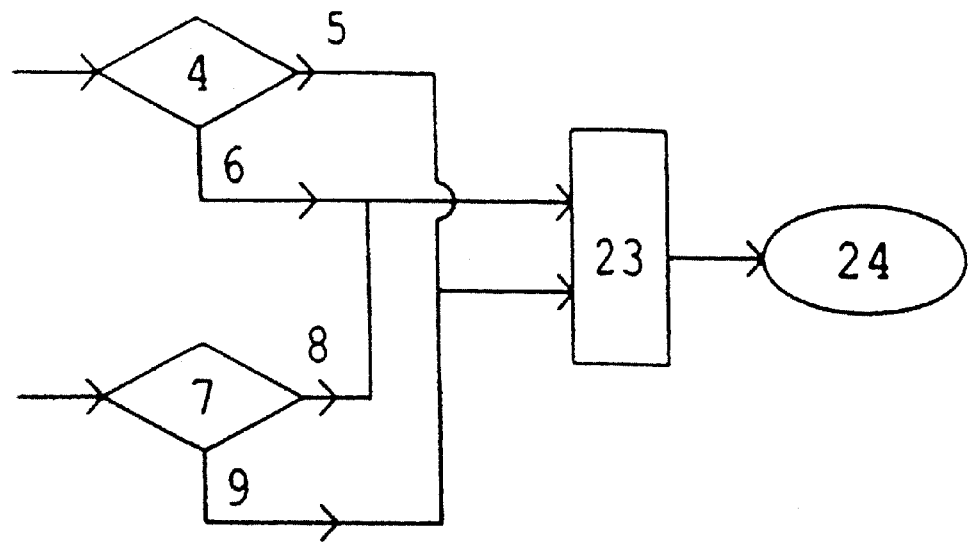
FIGS. 2 to 5 contain flowcharts illustrating aspects of the invention.

A flowchart in FIG. 2 illustrates two exemplary cases in which the encryption and the watermarking are not identified together. An exemplary case envisages that the first bifurcation 4 yields case 6, that is to say that the first identification of an encryption is negative, and that the second bifurcation 7 yields case 8, that is to say that a watermark is present. Then a second delivery 23 generates a prohibition of playing of the digital data 24. In practice, this could for example lead to an interruption of the playing of the data. Another exemplary case envisages that the first bifurcation 4 yields case 5, that is to say an encryption is identified, and that the second bifurcation 7 yields case 9, that is to say that the second identification of a watermark is negative. In this other case the second delivery generates the prohibition of playing 24.

Figure 3:
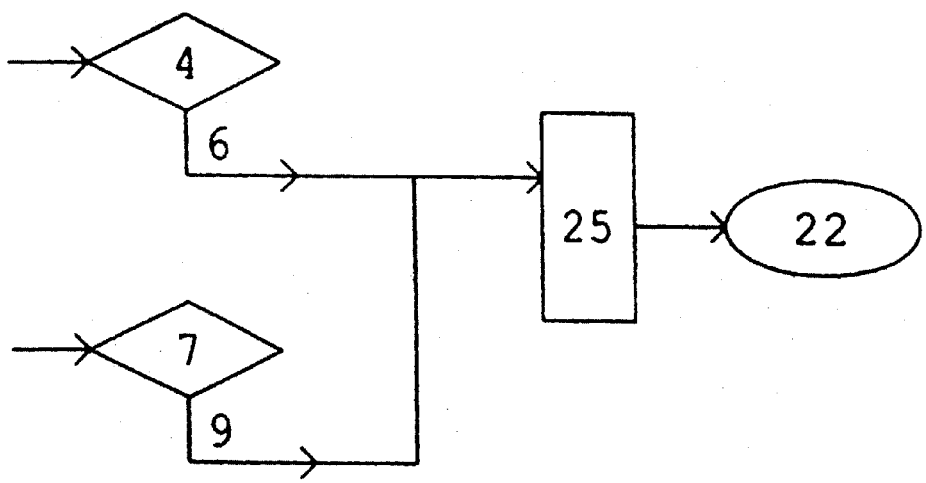

The method described allows to freely copy digital data which are not protected, for example data devoid of encryption and of watermark. FIG. 3 contains a flowchart in which the first and the second bifurcation 4 and 7 each yield a case of negative identification respectively cases 6 in respect of encryption and 9 in respect of watermark. A third delivery 25 then directly generates the digital copying permission 22.

In the last case it matters little whether the data are on a recordable or non-recordable information carrier. The absence of encryption and of watermark indicates a minimum level of data protection.

Figure 4:
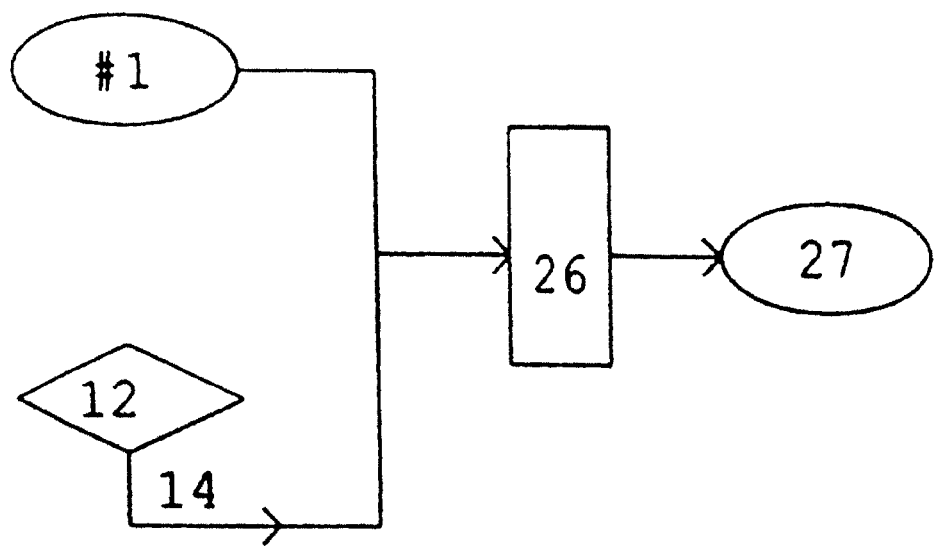

In certain exemplary cases it has to be possible to play and utilize the data but not to copy them. This is the case in particular when one purchases an information carrier containing digital data, the copying of which the author or the producer wishes to prevent. This is also the case when a recordable information carrier containing legally copied data is played. Such a case is illustrated with the aid of a flowchart in FIG. 4 where a fourth delivery 26 verifies that the first mark #1 has been delivered and that case 14 of identification of a type of information carrier different from the determined type has occurred before generating a prohibition of copying 27. In practice, the player would have to employ a device preventing copying of the digital data, for example by disabling a digital output of the player.

Figure 5:
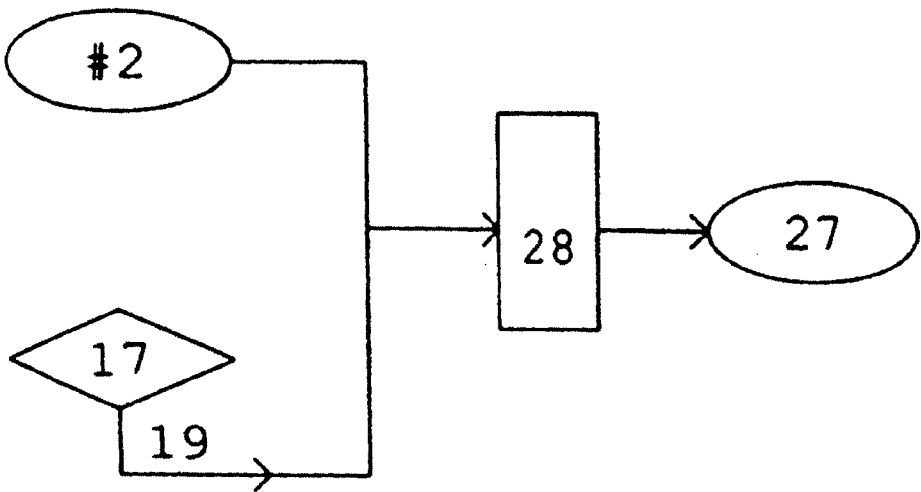

Another such case is illustrated with the aid of a flowchart in FIG. 5. If the second mark #2 is identified and case 19 signals a fourth negative identification, that is to say that no cryptographic signature permitting copying of the data is present, then a fifth delivery 28 generates the prohibition of copying 27.

Of course the fact that no cryptographic signature permitting copying of the data is identified does not exclude the presence of a particular cryptographic signature prohibiting copying.

Throughout the description, mention has already been made of the fact that the information carrier 1 is used in an appropriate player. The digital data stored on the information carrier 1 can in certain cases be conveyed to a digital output of the player. In the example of a DVD (optical disk for video/audio digital data) player, a digital output can be provided in order to output a signal representative of the data to a DVD-R (or other) player/recorder for copying purposes, or to a computer to carry out image processing. In general, the player also provides an analog output so as to be able to transmit an analog signal representative of the digital data to the analog input for example of a television set.

Figure 6:
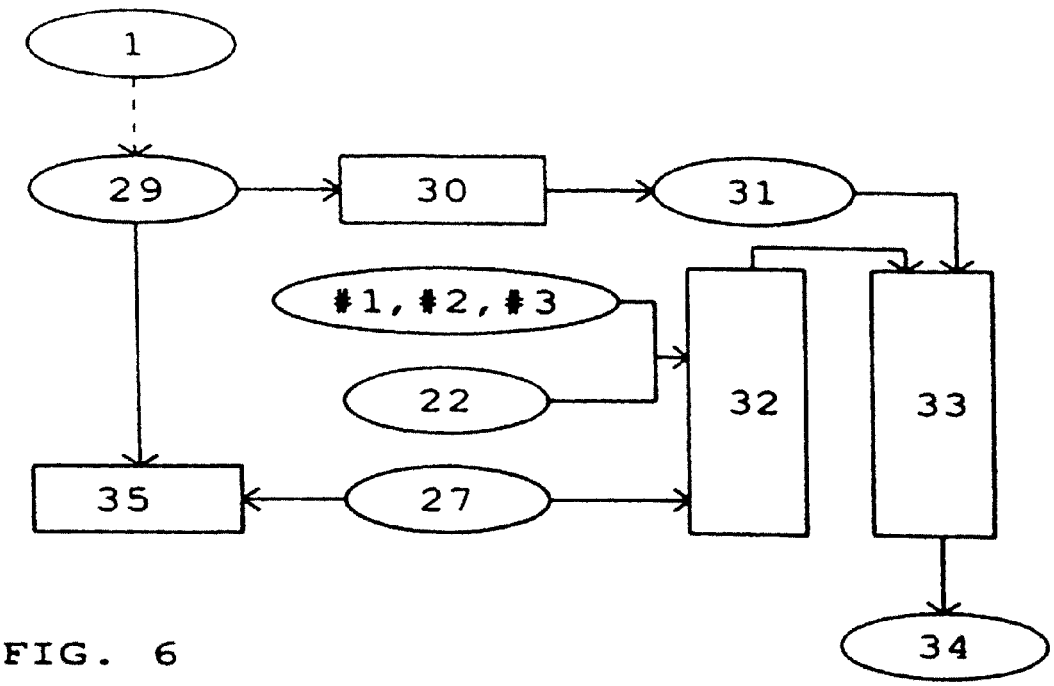
FIG. 6 contains a flowchart illustrating a digital/analog conversion according to the invention, FIG. 7 contains a flowchart illustrating aspects of the invention which relate to the encryption.
Figure 7:
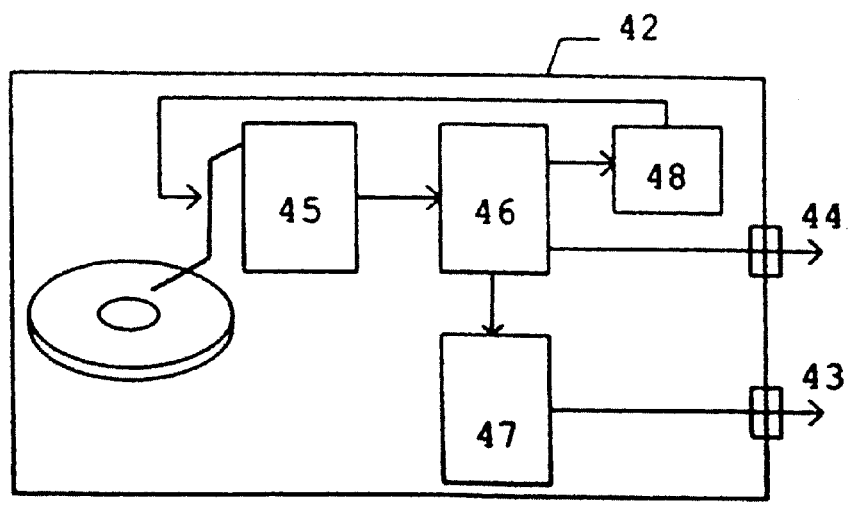

A flowchart in FIG. 6 indicates with a dashed arrow that the information carrier yields digital data 29. A conversion 30 makes it possible to convert the digital data 29 into analog signals 31. A presence of the permission for digital copying 22 together with any one of the first, second or third marks (#1, #2, #3), or a presence of the prohibition of digital copying 27, is detected in a detection 32 which as appropriate triggers a corruption 33 of the analog signals so as to obtain corrupted analog signals 34. The analog signals are for example corrupted in such a way that they can be used to obtain images on a television but that it is impossible to copy them with the aid of a video recorder with an analog input.

Advantageously there is envisaged a blocking at a digital output of the player of the digital data 35 in the presence of the prohibition of digital copying 27.

The encryption of the digital data on the information carrier is normally performed on the producer side.

The digital data as well as the cryptographic signature which may be associated therewith are decrypted in the data player. However, when these data have to be transmitted on a digital output of the player, the data are encrypted.

A device for playing digital data 42 in FIG. 8, comprises a digital output 43 which provides signals representative of the digital data upon playing the digital data of an information carrier. This output 43 can for example be implemented with the aid of a digital bus to the IEEE1394 standard. An analog output 44 provides analog signals representative of the same digital data. A decryption system 45 makes it possible to decrypt digital data if the latter are encrypted, but also to identify any watermark and cryptographic signature data. The decryption system makes it possible to accomplish for example the identifications 2, 3, 11 and 16 of the method illustrated in FIG. 1.

A system for protection against copying of the digital data 46 uses signals transmitted by the decryption system 45 and evaluates them by implementing the determinations 10, 15 and 20 of the method illustrated in FIG. 1 and delivers, after having determined the marks #1, #2 and #3, a copy permission signal.

A recording control part 47 manages a stream of digital data heading for the digital output. This part, when it obtains the copy permission signal from the protection system 46, can in particular activate the stream.

The system for protection against copying of the digital data 46 can also play the role of a playing protection system. With the aid of the signals received from the decryption system 45, the latter system generates a playing prohibition signal when the digital data are not encrypted but watermarked or else when the digital data are encrypted but not watermarked.

A playing control 48 makes it possible to interrupt the playing of the digital data when it receives the prohibition signal from the playing protection system 46.

We claim:

1. A method of protection against copying of digital audio/video data stored on a storage medium, said method comprising, performed in a device for playing said digital audio/video data:

identifying whether said digital audio/video data are encrypted using a crypto-graphic algorithm which does not generate a digital signature, identifying whether said digital audio/video data are protected by a watermark, and delivering one of a permission and a prohibition to copy and/or to play said digital audio/video data to said device as a function of an identification of:

an encryption of said digital audio/video data; and a watermarking of said digital audio/video data.

2. The method as claimed in claim 1, further comprising delivering a permission for digital copying to said device when:

the encryption of said digital audio/video data has not been identified; and the watermarking of said digital audio/video data has not been identified.

3. The method as claimed in claim 1, further comprising delivering a prohibition of playing of said digital audio/video data to said device when:

the encryption of said digital audio/video data has not been identified; and the watermarking of said digital audio/video data has been identified.

4. The method as claimed in claim 1, further comprising:

identifying a type of the storage medium; and delivering a prohibition of copying to said device when:

the encryption of said digital audio/video data has been identified;

the watermarking of said digital audio/video data has been identified; and a recordable type of storage medium has been identified.

5. The method as claimed in claim 1 further comprising performed in said device for playing said digital audio/video data:

converting the digital audio/video data into analog signals; and corrupting the analog signals if a prohibition of digital copying is delivered.

6. The method of protection according to claim 4 wherein the prohibition of digital copying comprises a blocking of output of the digital audio/video data of said device.

7. The method as claimed in claim 1, further comprising:

identifying a type of the storage medium; and said delivering step is a further function of the identification of a recordable or non-recordable type of said storage medium.

8. The method as claimed in claim 7, further comprising:

identifying whether a cryptographic signature accompanies said digital audio/video data; and said delivering step is a further function of the identification of the cryptographic signature accompanying said digital audio/video data.

\* \* \* \* \*